United States Patent [19]

Heumann et al.

[11] Patent Number: 5,005,991
[45] Date of Patent: Apr. 9, 1991

[54] SPHERICAL BEARING LINK

[75] Inventors: David E. Heumann, Jupiter; William G. Hoop, Palm Beach Gardens, both of Fla.

[73] Assignee: United Technologies Corporation, Hartford, Conn.

[21] Appl. No.: 129,023

[22] Filed: Dec. 4, 1987

[51] Int. Cl.⁵ .............................................. F16C 23/04
[52] U.S. Cl. .................................................... 384/208
[58] Field of Search ............... 384/211, 208, 510, 207, 384/206

[56] References Cited

U.S. PATENT DOCUMENTS

| | | | |
|---|---|---|---|
| 1,437,969 | 12/1922 | Fjellman | 384/510 |
| 2,382,349 | 8/1945 | Taylor | 29/149.5 B |
| 2,423,684 | 7/1947 | Collito, Jr. | 384/208 |
| 2,478,660 | 8/1949 | Keahey | 384/211 |
| 4,411,545 | 10/1983 | Roberge | 403/122 |
| 4,466,631 | 8/1984 | Berg | 280/415 |

Primary Examiner—Lenard A. Footland
Attorney, Agent, or Firm—Edward L. Kochey, Jr.

[57] ABSTRACT

A truncated spherical ball enters a cavity in a link using an entry slot in the link away from the end of the link and axially extending toward the link arm. Passage of the rotated ball through the entry slot is prevented by excess thickness of the ball relative to slot width until the link is expanded by heating. Full bearing surface exists at the end and sides of the link cavity and bearing surfaces are not contacted while forcing a fit. The ball is secure from inadvertent removal.

3 Claims, 1 Drawing Sheet

SPHERICAL BEARING LINK

The Government has rights in this invention pursuant to a contract awarded by the Department of the Air Force.

DESCRIPTION

1. Technical Field

The invention relates to ball and socket joints and in particular to a link having a spherical bearing.

2. Background of the Invention

Ball and socket or swivel joints have an outer ring with a spherical cavity and a spherical inner ring fitting inside the cavity. Various methods have been proposed to assemble the joint. In one known method the cavity has two diametrically opposed slots through one-half the thickness of the cavity with the width of the slot exceeding the width of the spherical inner ring. The inner ring is oriented 90 degrees from its normal position for entry through the slots and then rotated to its normal position.

These joints have been used in axially loaded links to permit universal movement around the connection. A plurality of such links are used in gas turbine engines to connect a plurality of movable nozzle flaps in a circumferential manner. In such an environment the links are highly loaded in tension. Full bearing surface is desired at the outside edge of the link, and stress concentrations should be avoided in highly stressed areas of the link. A method of assembly is desirable which will not damage the bearing surface. Since inadvertent installation of the link without the ball in place can lead to major component failure, the ball should not easily be removed.

SUMMARY OF THE INVENTION

An elongated link having a longitudinal axis has a spherical cavity receiving a truncated spherical ball member. The ball member has a width defined by flat opposing sides. The link cavity has a single entry slot located on the axis of the link at the side of the cavity away from the end of the link. This slot preferably passes through the entire thickness, facilitating manufacturing.

The slot preferably is slightly narrower than the width of the ball member so that with both members at room temperature the ball may not be installed or removed. Heating of the link to about 800° F. permits the ball to fit within this narrow slot after which it may be rotated to the normal operating position.

Full bearing surface is available on the outer edge of the link cavity where maximum forces are exerted with the link in tension. The entry slot is located at a minimum stress location avoiding the highly stressed side positions as well as the highly loaded bearing section near the end of the link. The ball cannot readily be removed and since restraint both on installation and on attempted removal is placed near the edge of the ball through interference with the slot, the bearing surface is not damaged.

DESCRIPTION OF THE PREFERRED EMBODIMENT

Link 10 has a longitudinal axis 12 with a link opening 14 located adjacent to the first end 16 of the link. A second opening 18 is located at the other end of the link. Since the openings are identical, only opening 14 will be discussed.

Figure 1:
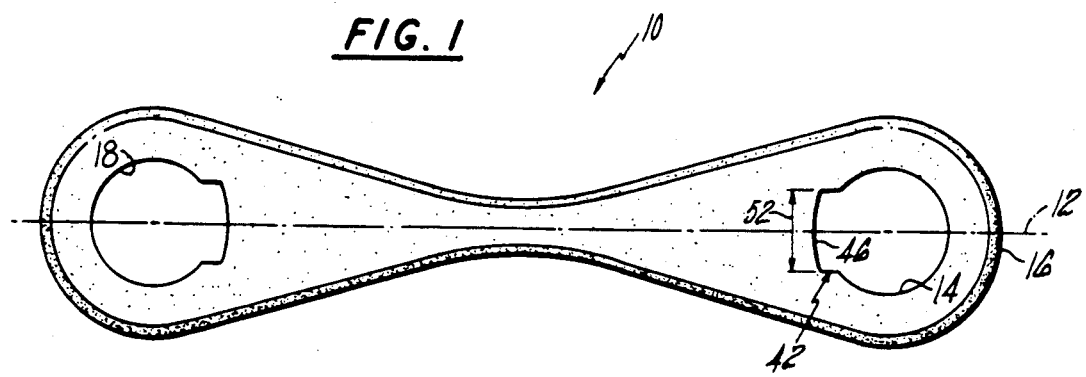
FIG. 1 is a plan view of the link without the balls installed.
Figure 2:
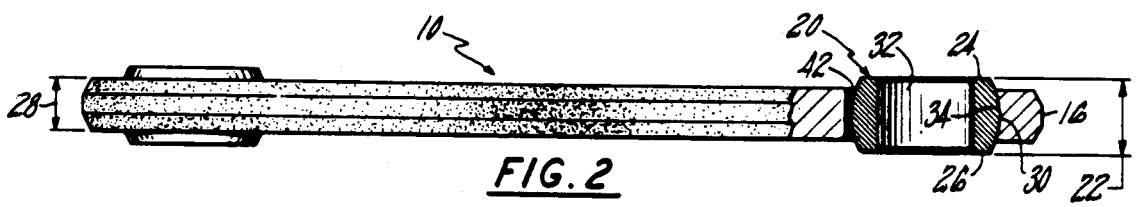
FIG. 2 is a side view of the link partly broken away with the balls installed.

As seen in FIG. 2 a ball member 20 is installed within opening 14 with this ball member having a thickness 22 between opposing flat sides 24 and 26 somewhat more than a thickness 28 of the link. The truncated ball illustrated in FIG. 2 has a spherical perimeter 30 of 0.823 inches diameter. It also has an opening 32 therethrough for connection to an outside member.

The link 10 has a spherical inner surface 34 of 0.4124 inch radius which is commensurate with the 0.4115 radius of surface 30 of the ball. This spherical surface 34 is uninterrupted at location 36 near the end of the link as well as being uninterrupted on both the location 38 on one side of the ball and location 40 on the other side of the ball. Accordingly, full bearing contact is maintained throughout these three quadrants.

Figure 3:
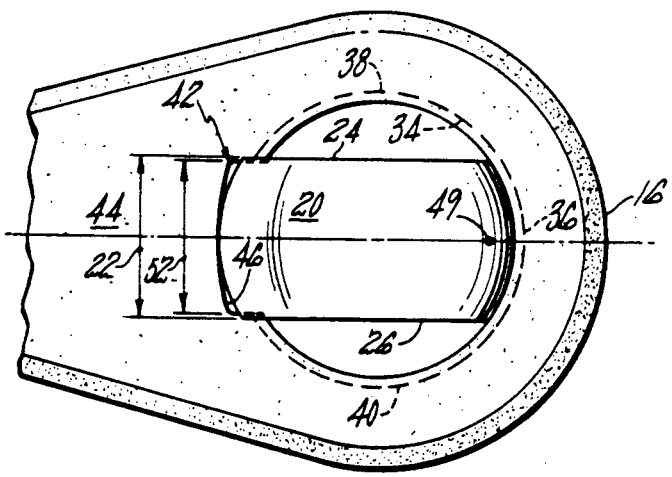
FIG. 3 is a plan view with the ball in position to be installed.
Figure 4:
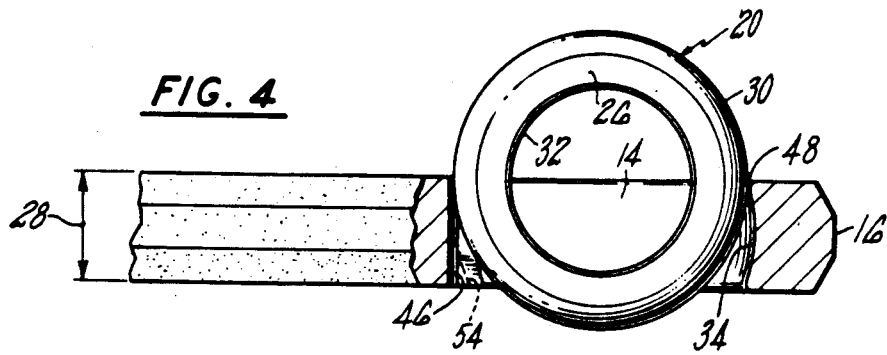
FIG. 4 is a sectional side elevation through FIG. 3 with the ball in position to be installed.

Referring to FIG. 3 the link opening 14 has an axially extending entry slot 42 with this slot only existing on the side of arm 44. The edge 46 of this slot has a radius of 0.75 inches from a center point 49 and as best seen in FIG. 4 passes completely through the thickness 28 of the link.

The slot is sufficiently deep that ball 20 may pass free of contact with lip 48 of opening 14 and clear surface 46. The width 22 between opposing sides 24 and 26 of the truncated ball is 0.450 inches which is slightly greater than the width 52 of the slot 42 which is 0.449 inches. It can be seen that the truncated ball 20 will not fit through slot 42 when both members are at the same temperature. However, by heating the link 10 to 800° F. with the ball 20 remaining at room temperature it may easily pass through this slot and then be rotated 90 degrees to its normal position.

Accordingly, the ball may not easily or inadvertently be removed at a later time. It is preferred that the slot 42 be a full depth slot as shown by surface 46 in FIG. 4. Although the dashed line 54 indicates that portion of the surface which must be removed, nothing is gained by such refinement and manufacturing simplicity is obtained by using the straight through slot.

Various prior art approaches have used opposing entry slots. An entry slot adjacent to end 16 not only removes bearing surface but thins the highly loaded end of the link. Other arrangements using opposed entry slots perpendicular to the axis of the link provides stress raisers at the sides near surfaces 38 and 40 thereby thinning and creating stress concentrations in this critically loaded area of the link.

We claim:

1. A spherical bearing link comprising:
   an elongated link having a longitudinal axis, at least one link opening adjacent at least one end, and an arm extending away from said end;
   a truncated ball member having a width defined by substantially flat opposing sides and having a spherical perimeter;
   an opening through said ball member substantially perpendicular to said opposing sides;

said link opening having a spherical inner surface commensurate with the spherical perimeter of said ball member on the edge of said link opening closest to the end, and also on both sides of said link opening along said axis;

said link opening having an axially extending entry slot only on the arm side of said link opening for receiving said ball member when turned to have the opposing sides of the ball member parallel to the axis of said link opening.

2. A bearing link as in claim 1:

said entry slot having a width slightly less than the distance between said opposing sides of said ball member when said link and said ball member are at the same temperature; and said entry slot having a width greater than the distance between said opposing sides of said ball member when said link is heated to an installation temperature with respect to said ball.

3. A bearing link as in claim 1:

said entry slot having a uniform depth through the thickness of said link.

* * * * *